United States Patent
Thebault et al.

(10) Patent No.: US 11,352,047 B2
(45) Date of Patent: Jun. 7, 2022

(54) STEERING COLUMN

(71) Applicant: ROBERT BOSCH AUTOMOTIVE STEERING VENDOME S.A.S., Vendome (FR)

(72) Inventors: Stephane Thebault, Aze (FR); Nicolas Genet, Coulommiers la Tour (FR); Christophe Pata, Coulommiers-la-Tour (FR); Jeremy Renard, Naveil (FR); Benjamin Moulys, Besse sur Braye (FR); Alexis De Weer, Vendome (FR)

(73) Assignee: ROBERT BOSCH AUTOMOTIVE STEERING VENDOME S.A.S., Vendome (FR)

( * ) Notice: Subject to any disclaimer, the term of this patent is extended or adjusted under 35 U.S.C. 154(b) by 0 days.

(21) Appl. No.: 16/958,988

(22) PCT Filed: Dec. 19, 2018

(86) PCT No.: PCT/EP2018/085856
§ 371 (c)(1),
(2) Date: Jun. 29, 2020

(87) PCT Pub. No.: WO2019/129574
PCT Pub. Date: Jul. 4, 2019

(65) Prior Publication Data
US 2020/0339177 A1    Oct. 29, 2020

(30) Foreign Application Priority Data

Dec. 27, 2017 (FR) .................................... 1763269

(51) Int. Cl.
*B62D 1/184*    (2006.01)
*B62D 1/19*    (2006.01)
(Continued)

(52) U.S. Cl.
CPC ............. *B62D 1/184* (2013.01); *B62D 1/195* (2013.01); *F16B 2/185* (2013.01); *B62D 1/189* (2013.01); *F16C 2326/24* (2013.01)

(58) Field of Classification Search
CPC ........ B62D 1/184; B62D 1/195; B62D 1/189; F16B 2/185; F16C 2326/24
See application file for complete search history.

(56) References Cited

U.S. PATENT DOCUMENTS 10,246,118 B2 * 4/2019 Baumeister ............... B62D 1/19
2006/0273567 A1 * 12/2006 Fix ......................... B62D 1/184
280/775
(Continued)

FOREIGN PATENT DOCUMENTS

CN    104024086    8/2016
EP    3 093 211    11/2016

OTHER PUBLICATIONS

PCT/EP2018/085856, Feb. 13, 2019, International Search Report and Written Opinion.

*Primary Examiner* — Darlene P Condra
(74) *Attorney, Agent, or Firm* — Ray Quinney & Nebeker; Paul N. Taylor

(57) ABSTRACT

Steering column comprising a cradle (21) mounted tilting on the body of the vehicle and receiving, in a deformable bearing (22), a sleeve (2) provided with a tube bearing the steering wheel.
A clamping device (3) comprising a manoeuvring lever (32) bearing a clamping axle (31) and pressed against a bearing block (34) by a ramp connection (341) and by an escutcheon (33) with teeth (331).
The bearing block (34), has a ramp (341) for each tooth (331) ending in a stop (343) projecting into the circular
(Continued)

segments (335) between two teeth (331). One of the teeth (331) has, on its unclamping side, a damping element (334).

11 Claims, 10 Drawing Sheets

(51) Int. Cl.
*F16B 2/18* (2006.01)
*B62D 1/189* (2006.01)

(56) References Cited

U.S. PATENT DOCUMENTS

| | | | |
|---|---|---|---|
| 2007/0234845 A1* | 10/2007 | Gist | B62D 1/184 |
| | | | 74/569 |
| 2009/0020995 A1* | 1/2009 | Kim | B62D 1/184 |
| | | | 280/775 |
| 2011/0064538 A1* | 3/2011 | Oertle | B62D 1/184 |
| | | | 411/360 |
| 2011/0156380 A1* | 6/2011 | Dietz | B62D 1/184 |
| | | | 280/775 |
| 2013/0104688 A1* | 5/2013 | Okada | B62D 1/184 |
| | | | 74/493 |
| 2014/0373663 A1 | 12/2014 | Hahn | |
| 2016/0297463 A1* | 10/2016 | Tomaru | B62D 1/187 |

* cited by examiner

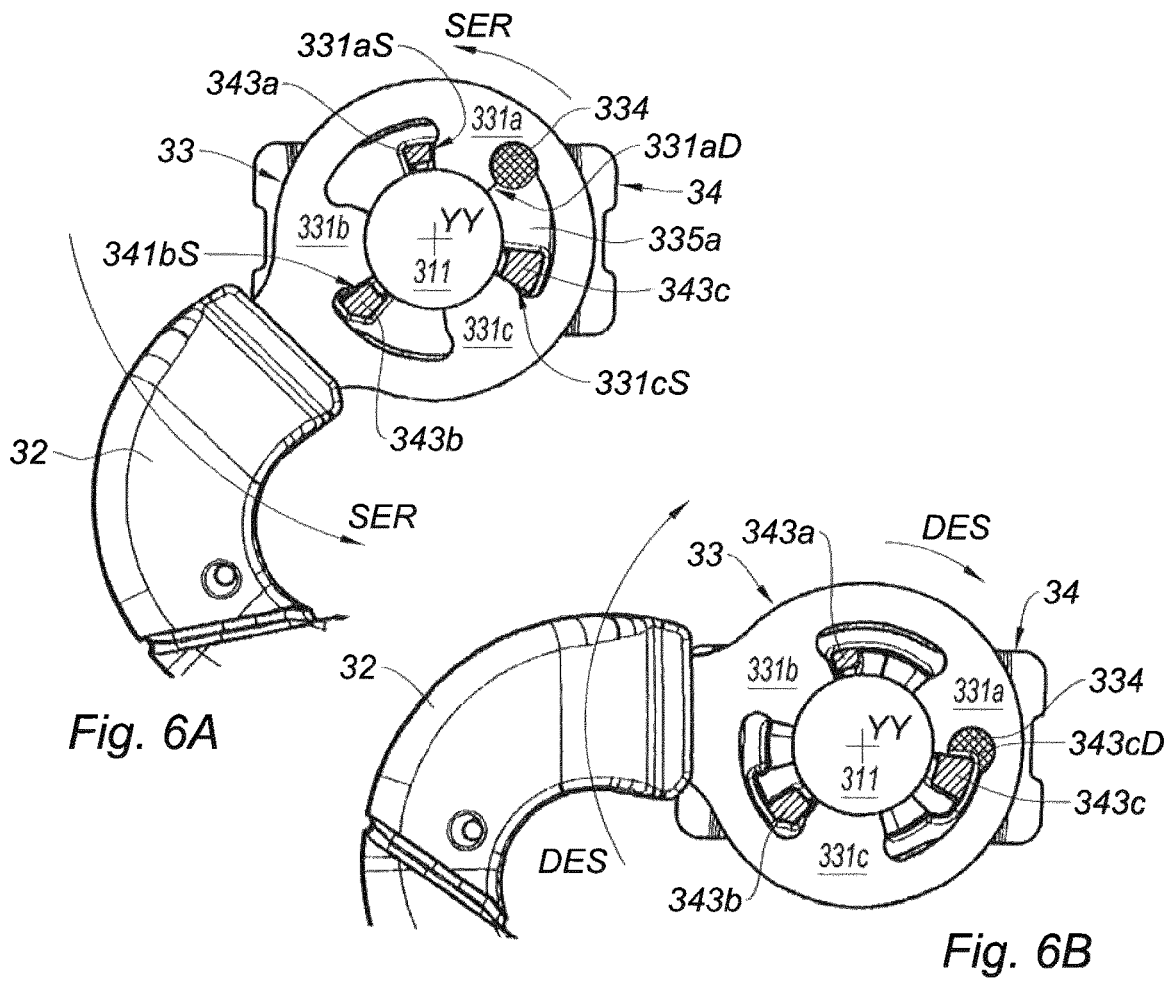
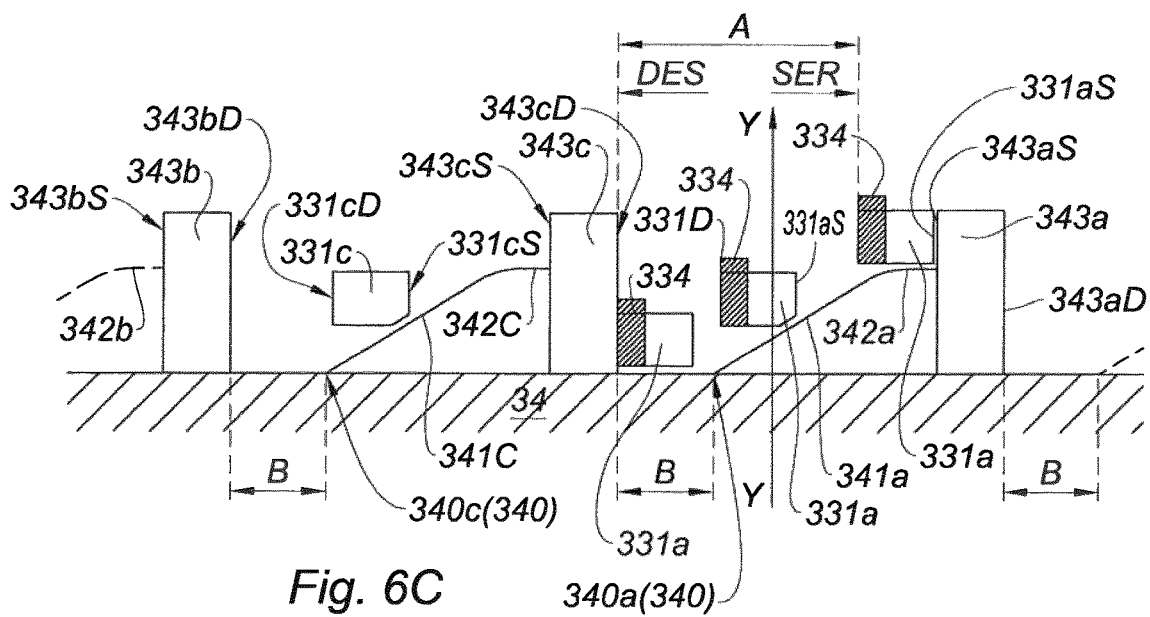
Fig. 6A
Fig. 6B
Fig. 6C

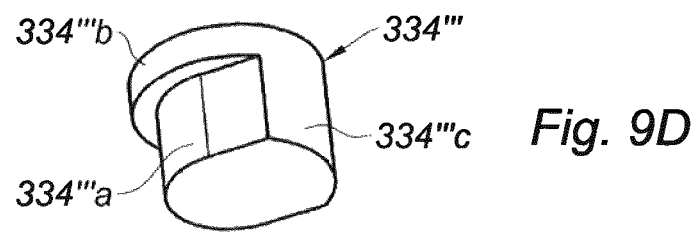
*Fig. 9D*
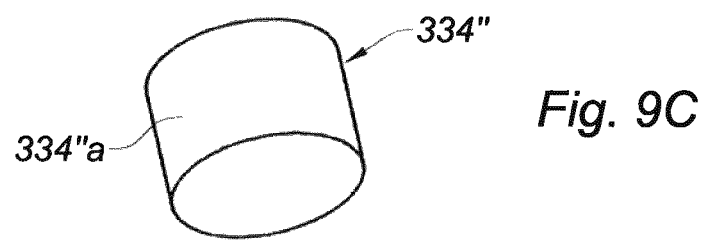
*Fig. 9C*
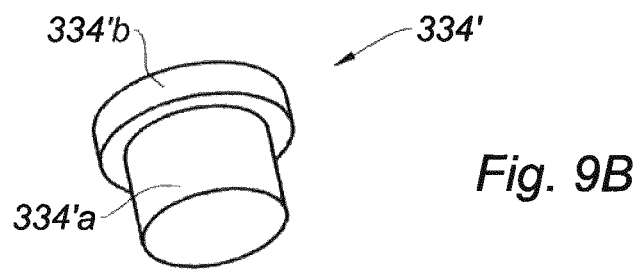
*Fig. 9B*
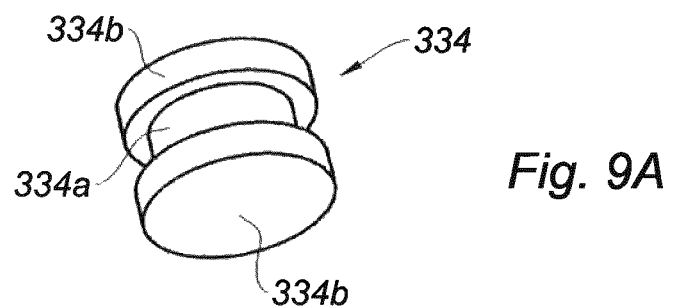
*Fig. 9A*
*Fig. 9*

STEERING COLUMN

FIELD OF THE INVENTION

The present invention relates to a steering column comprising:
A. a cradle mounted tilting on the body of the vehicle and receiving, in a deformable bearing, a sleeve provided with a tube bearing the steering wheel and translationally integral with the sleeve but rotationally free with respect thereto,
the sleeve being adjusted by sliding in the unclamped deformable bearing,
B. a device for clamping the deformable bearing comprising:
a manoeuvring lever bearing, by an escutcheon, a clamping axle of which the end is pressed directly against the bearing, the lever pressing against the bearing through a bearing block rotationally fixed but translationally free on the clamping axle,
the lever being pressed by its escutcheon against the bearing block by a ramp connection which,
for the movement of the lever in the direction of clamping, clamps the bearing between the end of the screw and the bearing block to block the deformable bearing on the sleeve, and
for the movement of the lever in the direction of unclamping, frees the bearing and the sleeve for the adjustment.

PRIOR ART

It is known to dampen the unclamping movement of the steering column to enable both its tilting and sliding adjustment but the means used are in general complicated and especially they do not make it possible to avoid end of travel noise which is a metal against metal noise.

AIM OF THE INVENTION

The aim of the present invention is to develop a steering column comprising means making it possible to make its unlocking silent in order to improve the comfort of use for the adjustment manoeuvring of a steering column.

DESCRIPTION AND ADVANTAGES OF THE INVENTION

For this purpose, the invention relates to a steering column of the type defined above, characterised in that the escutcheon has at least one circular segment of which one end constitutes an end of clamping travel and the other end constitutes an end of unclamping travel having a damping element, the bearing block, traversed by the clamping axle, having a stop projecting into the circular segment to come against the end of clamping travel in clamped position and against the damping element in unclamped position.

This steering column has the advantage of having very silent operation and avoiding the impact of the mechanism at the end of unclamping travel. This solution improves the comfort of use and is particularly simple to carry out without impinging on the safety of the clamping of the steering column after its adjustment.

According to another particularly advantageous characteristic, the deployable connection between the escutcheon and the bearing block is formed by an escutcheon with teeth fixing the clamping axle and leaving between them circular segments, and by the bearing block, traversed by the clamping axle, having, distributed around the bearing of the axle, a ramp for each tooth, these ramps ending in a stop projecting into the circular segments between two teeth so that each tooth goes up its ramp during the clamping movement and goes down it during the unclamping movement, the stop of at least one ramp coming against the damping element of its circular segment.

According to another advantageous characteristic, the ramp continues by a plateau upstream of its stop in the direction of clamping.

This plateau stabilises the positioning of the tooth/escutcheon avoiding any inadvertent opening of the clamping of the adjustments of the steering column in the event of impact.

According to another characteristic, the damping element is fixed by snap fitting in a cut-out of the edge on the unclamping side of the tooth. This particularly simple embodiment makes it possible to equip easily the steering column.

According to another advantageous characteristic, the damping element in the form of a pin made of a flexible material is composed of a circular cylindrical intermediate part and two widened ends extending beyond the two faces of the escutcheon, the intermediate part being snap fitted in the circular cut-out of dimensions greater than those of a circular half-disk.

The shape of the damping element which is thus pressed against the two faces of the escutcheon guarantees its efficient maintaining and its damping effect.

According to another advantageous characteristic, the ramp is in the form of a helicoidal surface of which the axis is the geometric axis of the clamping axle. This shape of ramp is particularly simple to achieve since of a simple geometric shape.

According to another characteristic, the teeth and the stops have sides of radial orientation with respect to the geometric axis of the clamping axle.

This shape of the teeth and stops goes in the sense of an embodiment simplification and efficiency of operation.

According to another advantageous characteristic, the bearing surface of a tooth on the escutcheon is smaller than the interval between the origin of the ramp and the side of the stop delimiting this interval with the origin. A stable positioning of the escutcheon in unclamped position is thus guaranteed without however hindering the clamping movement of the steering column once the adjustments made.

In an alternative to this embodiment, according to another advantageous characteristic, the deployable connection is formed by an escutcheon provided with a circular segment and connected to the bearing block by ball joint connecting links, received in ball joint cups of the escutcheon and the bearing block, the bearing block having at least one stop coming in the circular segment of which the end of unclamping travel is provided with the damping element.

According to an advantageous characteristic, the damping element or pin is chosen from the group comprising:
a damping element formed of a cylindrical body with circular section bordered by two widened ends,
a damping element forming a cylindrical body with circular section, bordered by a widened end,
a damping element formed of a cylindrical body with circular section,
a damping element formed of a cylindrical body with oval section forming a protrusion and a widened end.

DRAWINGS

The present invention will be described hereafter in a more detailed manner by means of embodiments of a steering column represented in the appended drawings in which.

Figure 1:
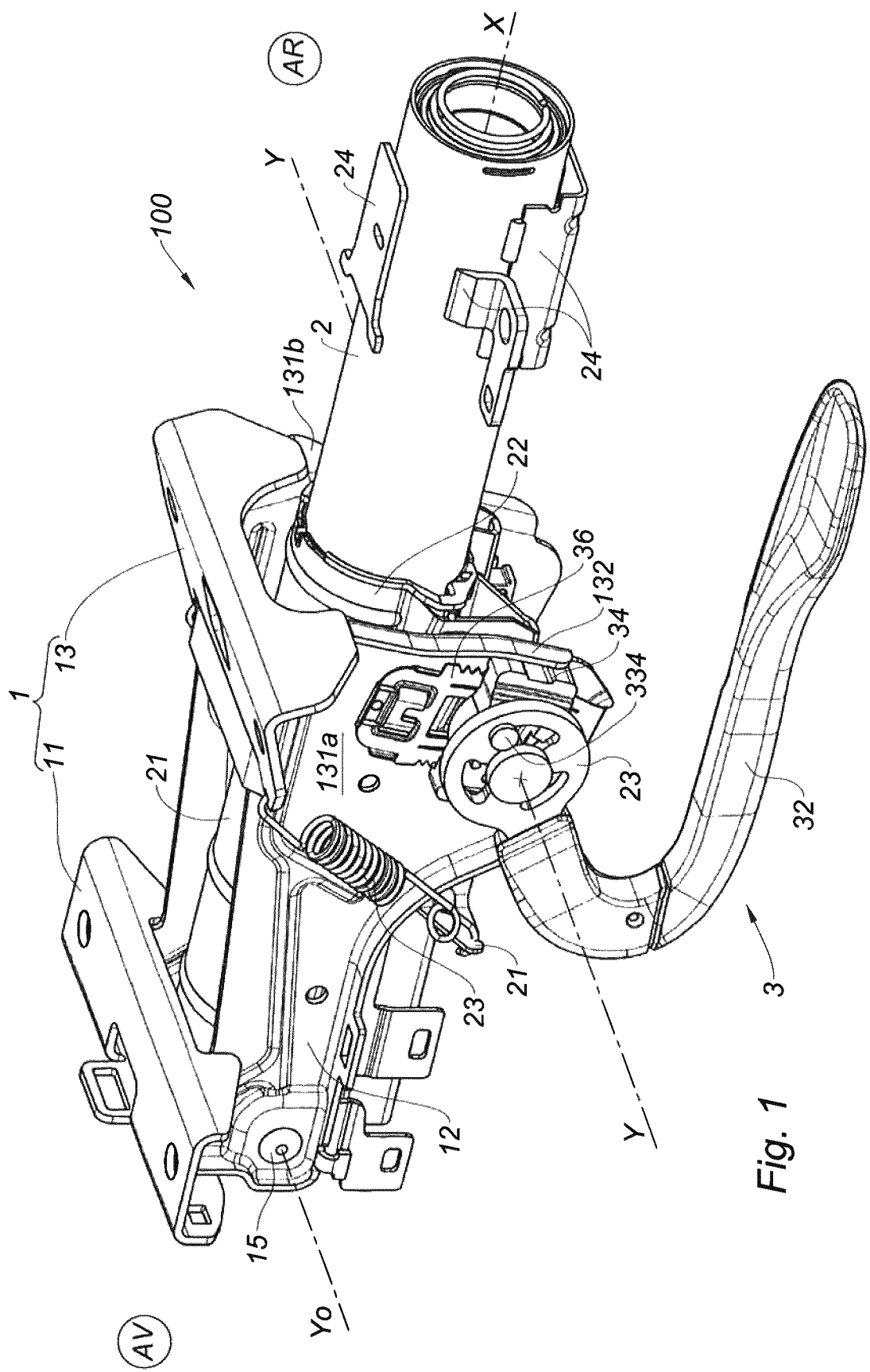
FIG. 1 is an isometric view of a steering column according to the invention.
Figure 3:
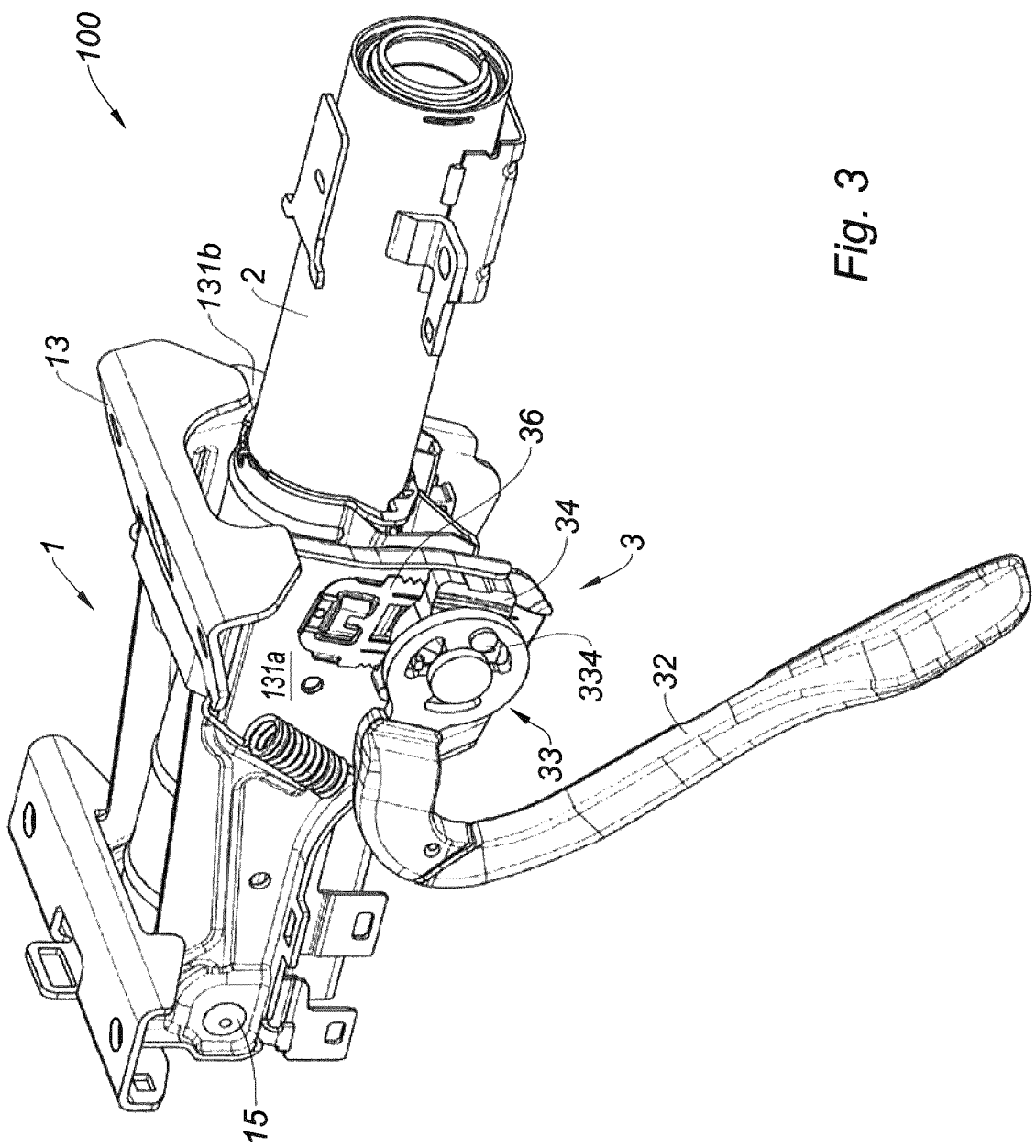
Figure 4:
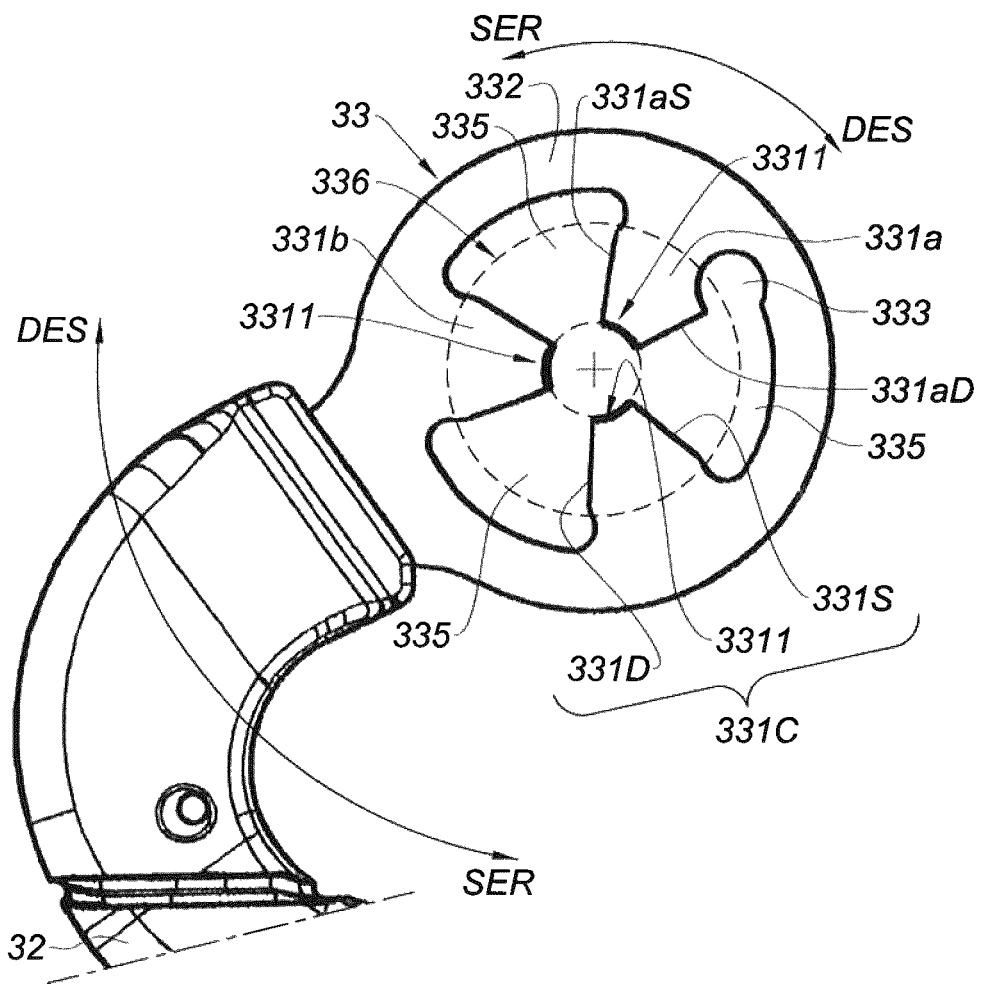
Figure 5:
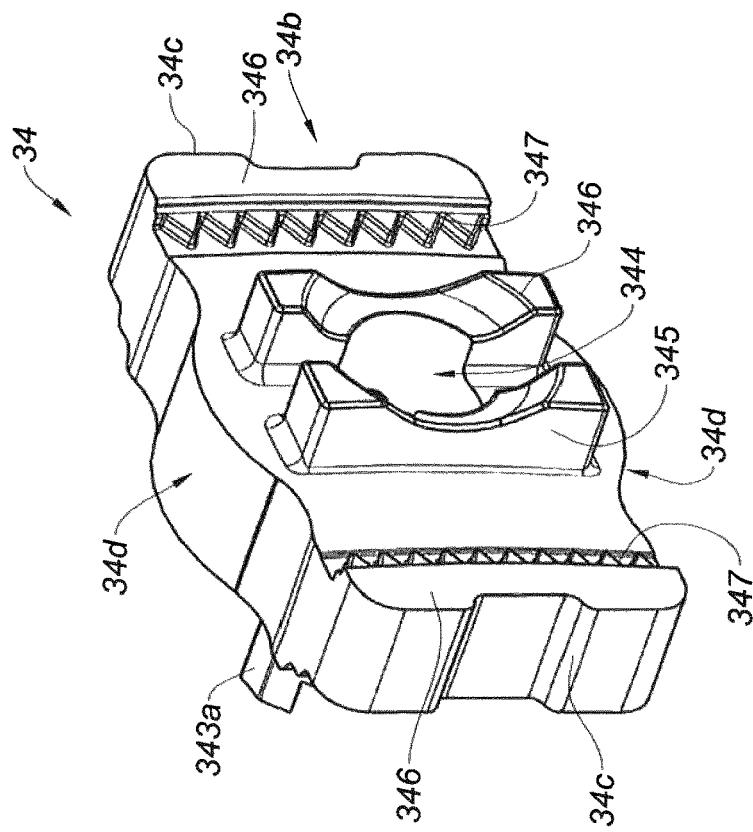
Figure 5:
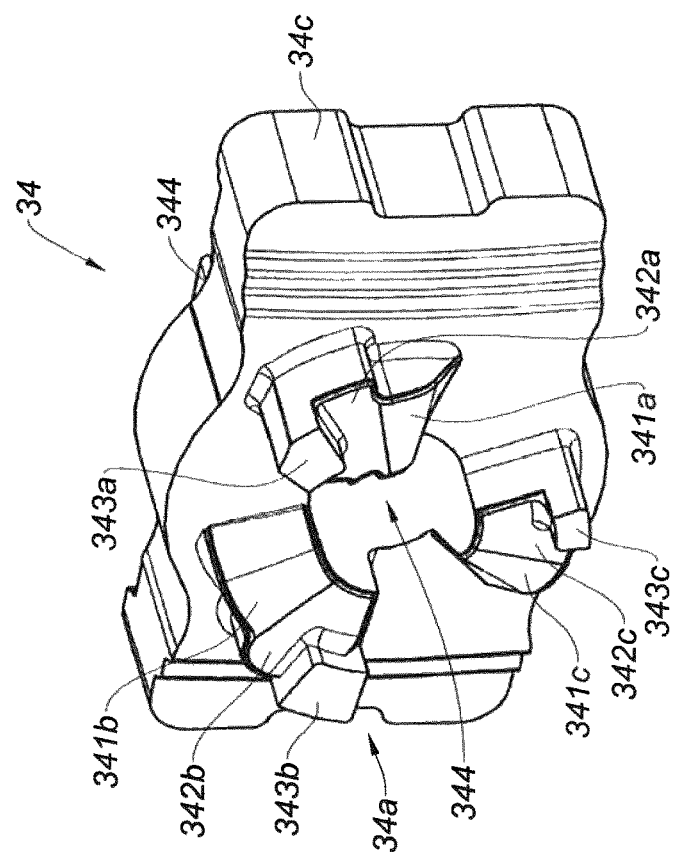
Figure 7A:
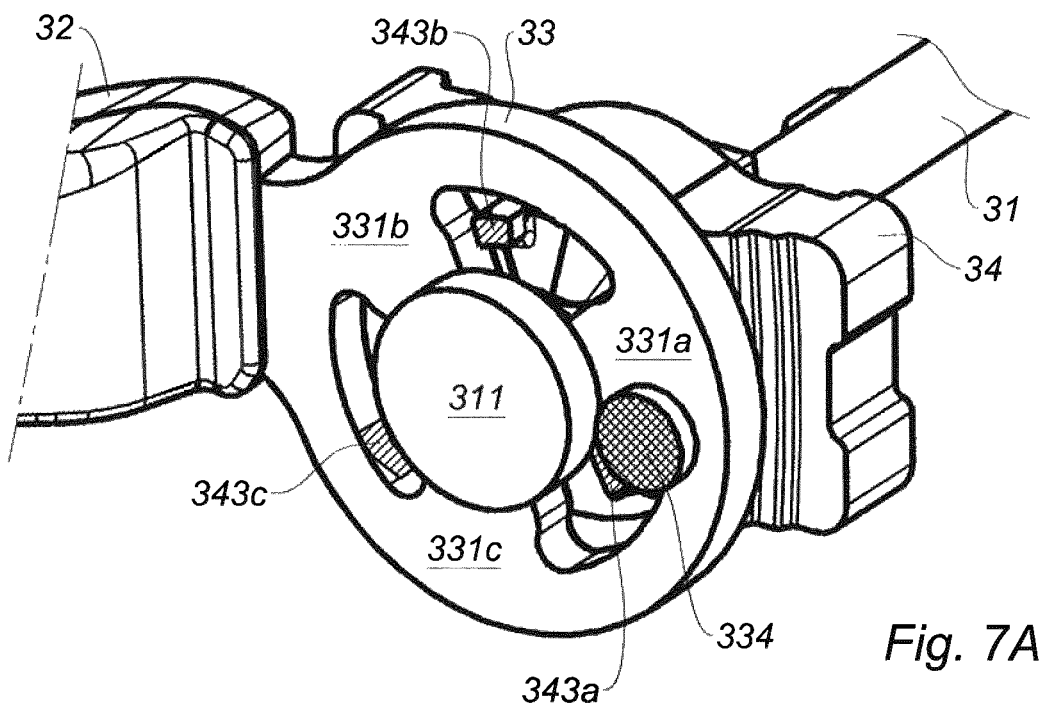
Figure 7B:
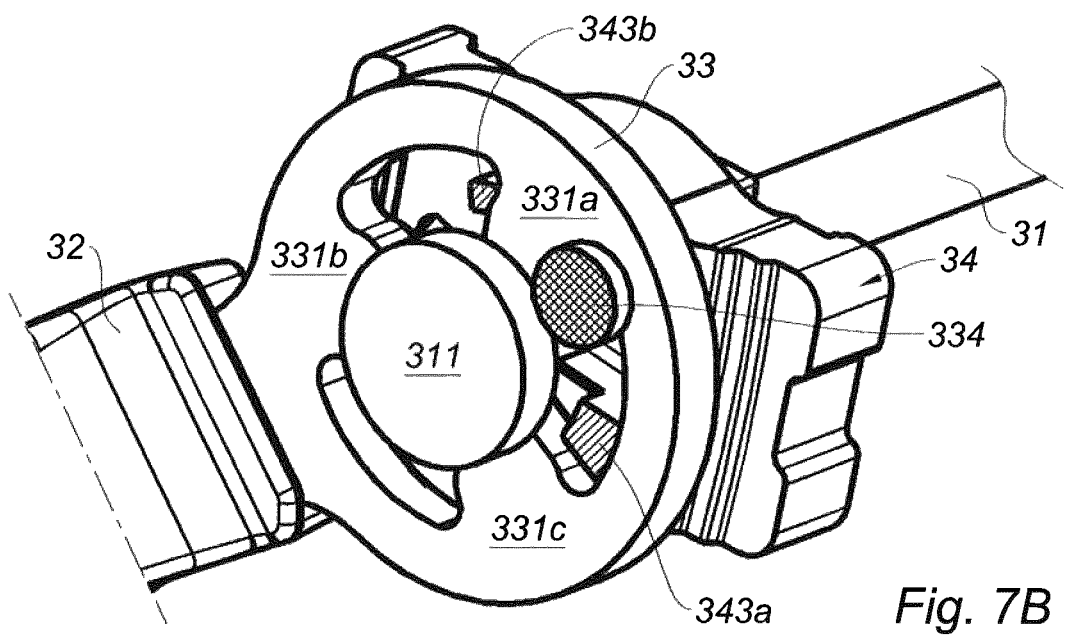
Figure 8A:
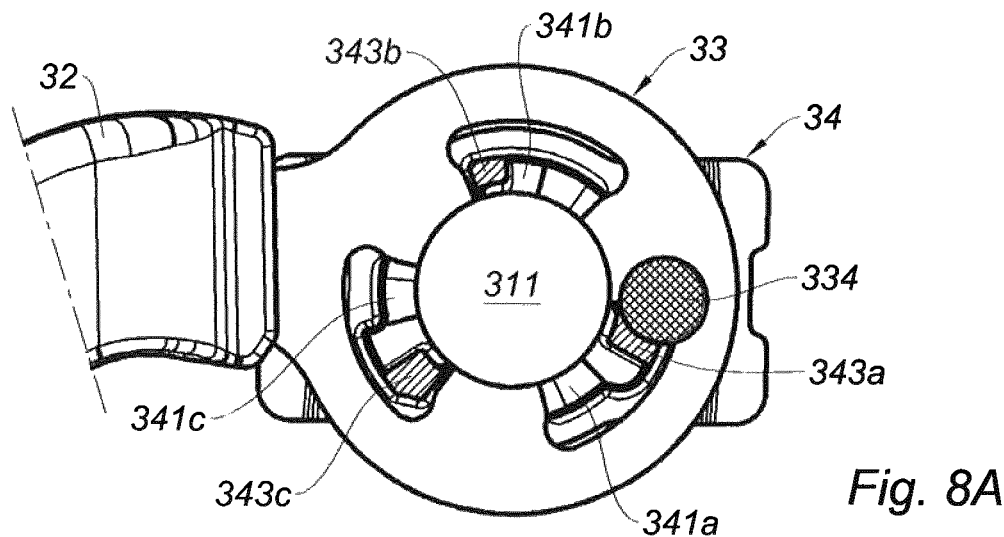
Figure 8A:
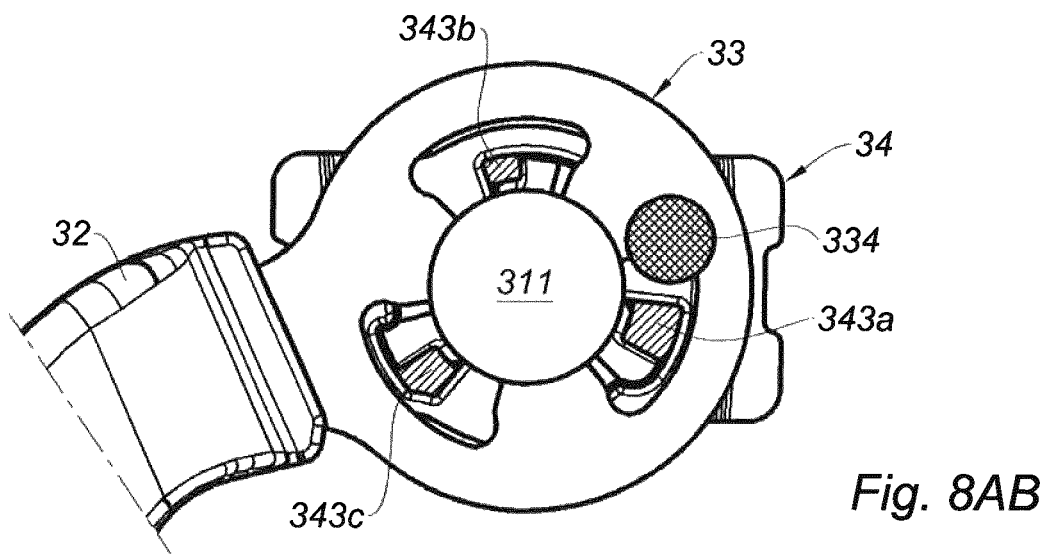
Figure 8B:
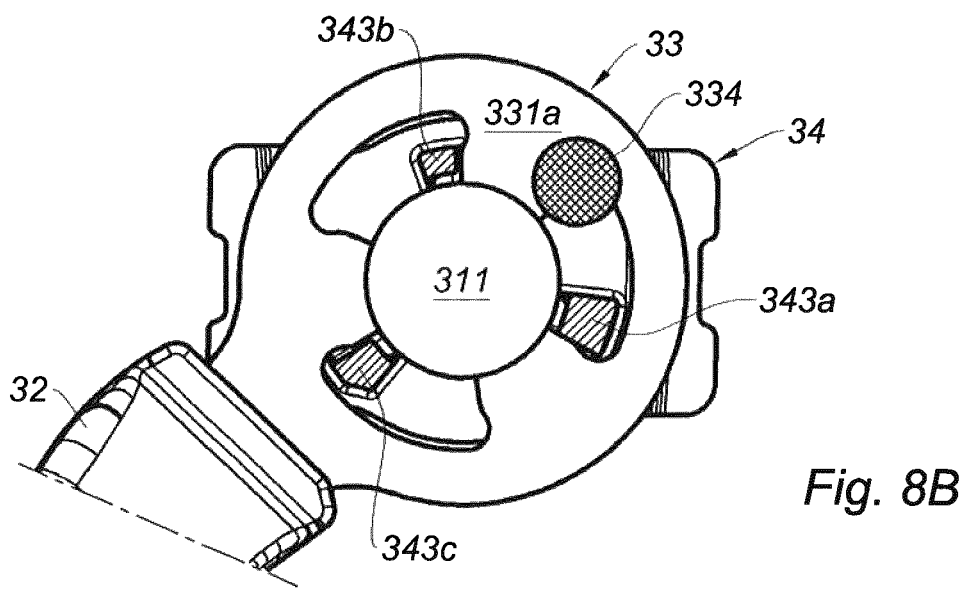
Figure 10:
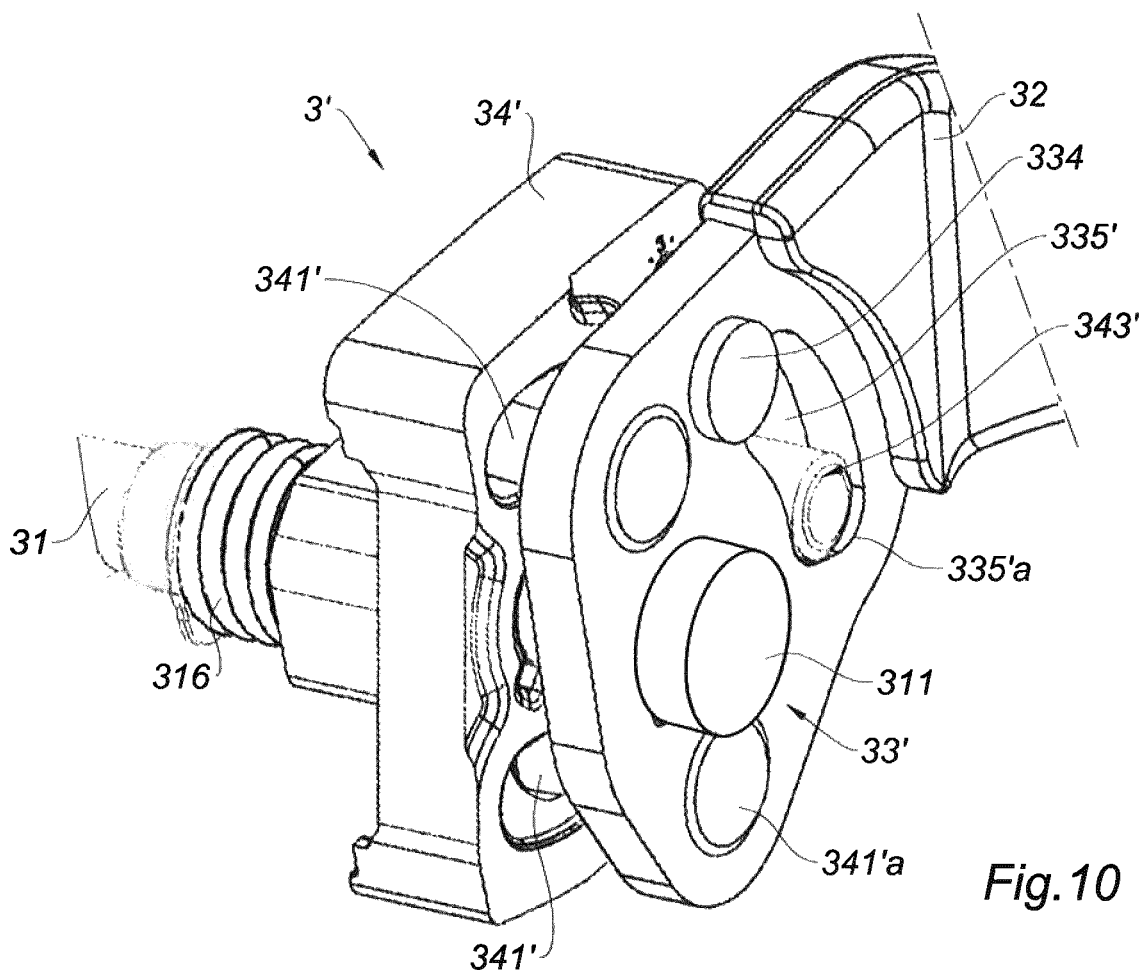
Figure 11:
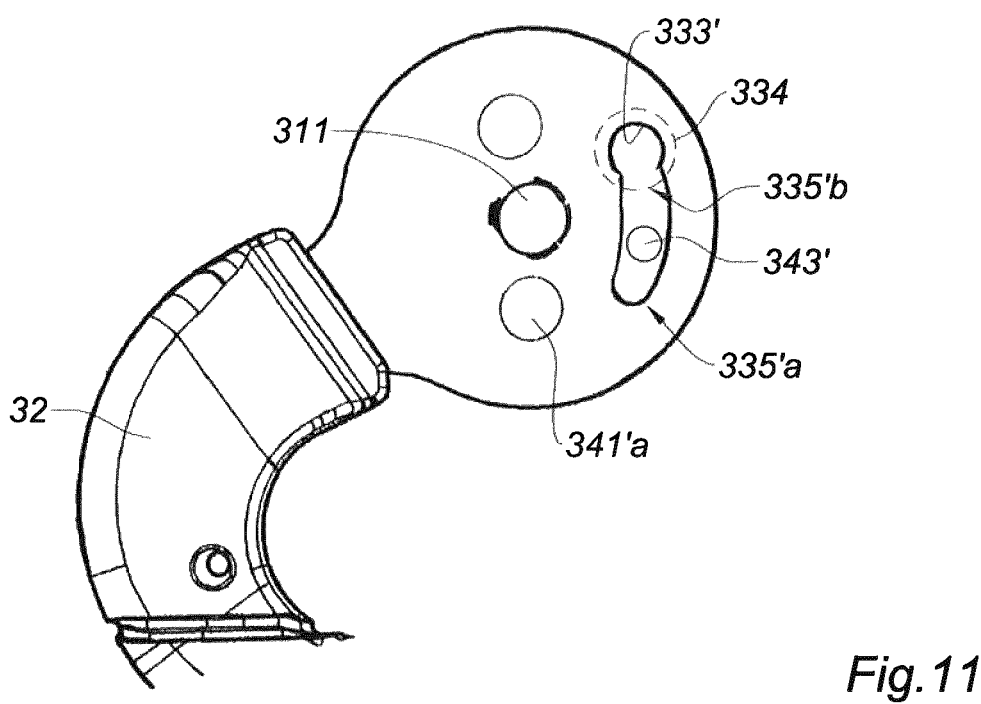

FIG. 3 is an isometric view of the steering column of FIG. 1 in adjustment position, FIG. 4 represents a manoeuvring lever with its escutcheon, FIG. 5, in its parts 5A, 5B, shows respectively in isometric, front and back view the bearing block of the clamping device, FIG. 6, in its parts 6A, 6B, shows the manoeuvring lever combined with the bearing block in locking position and in unlocking position, its part 6C showing the sequencing of a section of the ramps of the bearing block, FIG. 7, in its parts 7A, 7B, shows each time an isometric view of the position of the manoeuvring lever and the bearing block in unclamping position and in clamping position, FIG. 8, in its parts 8A, 8AB, 8B, shows respective frontal views of the manoeuvring lever with its escutcheon and the bearing block in unclamped position, in intermediate position and in clamped position, FIG. 9 in its parts 9A-9D, shows different embodiments of the damping element, FIG. 10 is an isometric view of an alternative of clamping device, FIG. 11 is a frontal view of the escutcheon of the clamping device of FIG. 10.

DESCRIPTION OF EMBODIMENTS OF THE INVENTION

For the description of the different figures, as orientation convention that of the steering column 100 represented in FIG. 1 will be used and the expressions "upstream" and "downstream" are associated with movement in the clockwise direction which is also that of the direction of pivoting of the manoeuvring lever to unclamp the blocking of the steering column 100. The front AV/rear AR side is that of the steering column installed in a vehicle.

FIG. 1 shows in isometric view a steering column 100 according to the invention composed of a support 1 fixed to the body and bearing an adjustable sleeve 2 provided with a tube, not represented, bearing the steering wheel. The tube is translationally integral but rotationally free of the sleeve 2. The sleeve 2 is blocked/unblocked for the adjustment by a clamping device 3. The steering column 100 is adjustable in inclination and in length with respect to the body.

The support 1 is formed of a front cross-member 11, connected by two sides 12 to a rear yoke 13. The cross-member 11 and the yoke 13 are fixed to the body so as to suspend the steering column 100 to adjust the inclination and the length thereof. A spring 23 on one side or on both sides retains the cradle 21 of the sleeve 2 to the support 1 to support the sleeve 2 during the angular adjustment movement and the longitudinal adjustment movement.

The sleeve 2 is borne by the cradle 21 mounted tilting around a transversal pivot 15 of axis Yo-Yo for the angular adjustment of the steering column. At its other end, the cradle 21 is provided with a deformable bearing 22 receiving the sleeve 2 adjustable longitudinally with respect to the cradle while being rotationally blocked. The deformable bearing 22 passes between the two arms 131 of the yoke 13 of upturned U shape.

The clamping device 3 associated with both the cradle 21 and the support 1 at the level of its yoke 13 and its deformable bearing 22 carries out at the same time the blocking of the movements of angular and longitudinal adjustment of the sleeve 2 and thus of the steering column 100. The clamping device 3 is controlled by the manoeuvring lever 32 between its clamping position (FIG. 1) and its unclamping position for the adjustment (FIG. 3).

Figure 2:
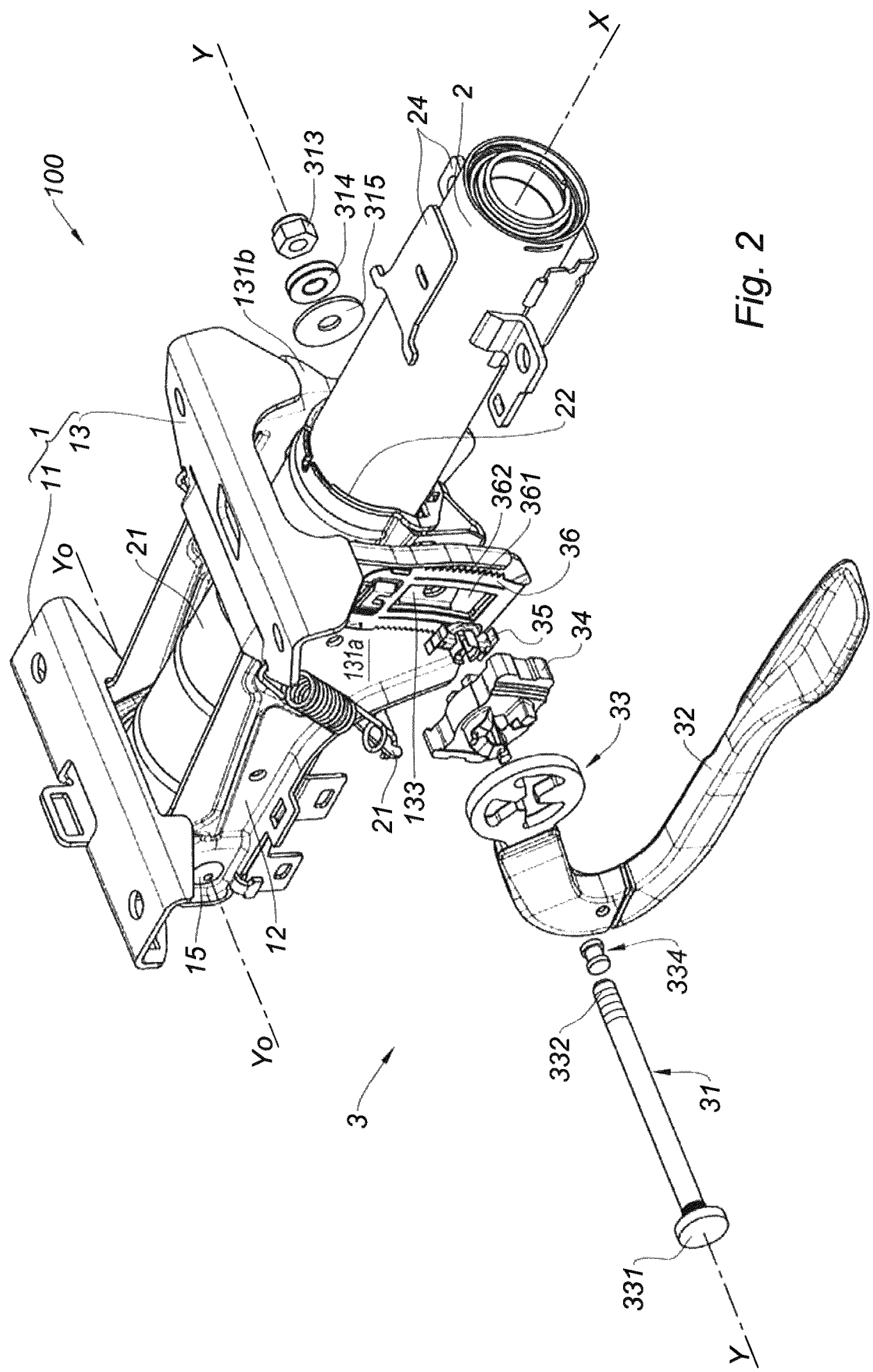
FIG. 2 is an exploded view of the steering column of FIG. 1.

The exploded view of FIG. 2 shows more specifically the detail of the clamping device 3 aligned on the transversal axis YY, perpendicular but not coplanar to the axis XX of longitudinal adjustment of the steering column 100. The angular adjustment is done by tilting around the axis Yo-Yo of the pivot 15 connecting the cradle 21 of the sleeve 2 to the sides 12 of the support 1. The geometric axis YY of the clamping device 3 is moveable because integral with the cradle 21 or deformable bearing integral with the cradle 21 through the deformable bearing 22.

The clamping device 3 aligned on the geometric axis YY, comprises:
a clamping axle 31 borne by
a manoeuvring lever 32 integral with the clamping axle 31 by
an escutcheon 33 fixed to the end of the clamping axle 31,
a bearing block 34,
a rider 35,
a guiding plate 36.

These components 33, 34, 35, 36 are traversed by the clamping axle 31 passing under the sleeve 2 after having traversed a slide of the first arm 131a of the yoke 13 to next traverse a second slide in the second arm 131b of the yoke 13 and to receive, beyond the second arm, a nut 313 screwed onto the threaded end of the clamping axle 31 with interposition of a needle roller stop 314 and a washer 315.

In this succession of components, the escutcheon 33 is pressed against the face 34a of the bearing block 34 itself coming against the first arm 131a of the yoke 13; the nut 313 comes externally against its second arm 131b.

The second arm 131b of the yoke 13, which only appears partially, is of simpler shape than the first arm 131a and only comprises a "vertical" slide for the passage of the clamping axle 31 without the components for blocking the angular adjustment as is the case for the first arm 131a appearing in the isometric views of FIGS. 1, 2, 3.

The bearing block 34 is rotationally fixed with respect to the axle 31 but translationally free both in the "vertical" direction of the slide of the arm 131a and along the clamping axle 31 (direction YY) such that the cam effect described, between the escutcheon 33 and the bearing block 34, generates by the pivoting of the escutcheon 33 and the lever 32 the axial displacement of the bearing block 34 which, along the direction of displacement, compresses or decompresses the arm 131a, 131b, the deformable bearing 22 and the cradle 21 on the sleeve 2 with respect to the yoke 13.

FIG. 3 shows the steering column 100 in adjustment position, unclamped. The lever 32 has been pivoted in the clockwise direction from its clamping position represented in FIG. 1.

According to FIGS. 2 and 4, the escutcheon 33 is integral with the end of the manoeuvring lever 32 of bent shape. The escutcheon 33 is a circular disk cut with three radial teeth 331 borne by a peripheral crown 332 and forming, by the ends 331l, a discontinuous circular surface wherein is fixed the clamping axle 31, by a shrink fitted connection.

The teeth 331 are identified for the description of their operation by their numerical references completed by a suffix a, b, c; each tooth 331 (see the tooth 331c) has a clamping side 331S and an unclamping side 331D along the direction of pivoting of the lever 32 and the escutcheon 33 to arrive in clamping position (arrow SER) or in unclamping position (arrow DES) corresponding respectively to the anticlockwise direction and to the clockwise direction.

The sides facing two teeth 331 delimit between them a circular segment 335 each covering the relative path of circulation 336 of the cams in the form of ramps 341 (FIG. 5A) with which the teeth 331 (FIGS. 5A, 6A-6C) cooperate. Applied to the pivoting movement of the lever 32 and the escutcheon 33, this signifies that each tooth 331 is in the circular interval between the two stops of two successive ramps, for example 343aS and 343cD.

One (331a) of the teeth 331 has a side 331aD (coming against the end of unclamping travel stop), with a cut-out 333 to receive the damping element 334. The damping element 334 is notably in the form of a pin to dampen the end of unclamping travel.

The radial teeth 331 (FIG. 4), of triangular shape, delimit the circular segments 335 after putting in place the axle 31 of which the head 311 comes to be pressed externally against the teeth 331.

The damping pin 334 (FIGS. 2 and 9) made of a flexible material is in the form of a dolly with its two widened ends 333b extending onto the two faces of the escutcheon 33 whereas the intermediate part is a cylindrical body 334. The damping element or pin 334 is snap fitted by its cylindrical body in the circular cut-out 333 of section preferably greater than a circular half-disk to make it possible to retain the pin efficiently. FIG. 1 show the damping pin 334 installed by snap fitting in the escutcheon 33, represented in the position of end of clamping pivoting travel of the manoeuvring lever 32.

The escutcheon 33 cooperates with the bearing block 34 traversed freely by the clamping axle 31 (FIG. 2, FIGS. 5A, 5B). The block 34 of rectangular shape has a face 34a turned towards the escutcheon 33 and a back 34b turned towards the first arm 131 of the yoke 13.

The face 34a (FIGS. 2 and 5A) is provided with three ramps 341a-c distributed symmetrically around the bearing 344 traversed by the clamping axle 31. The three ramps 341a-c increasing in the anticlockwise direction (direction of clamping SER) from their origin 340 on the face 34a of the block 34, are followed by a plateau 342a-c and they each end by a stop 343a-c. Each ramp 341 is a substantially helicoidal surface with respect to the geometric axis YY of the bearing 344 of the bearing block 34.

The origin 340 of each ramp 341 is distant from the stop 343 of the preceding ramp by an interval B enabling the abutment of the tooth 331.

Since the ramp 343 is a helicoidal surface, its origin 340 on the face 34a is radial in the same way as the faces 343S and 343D of the stops 343, as will be seen hereafter.

The interval B between the beginning 340 of the ramp and the stop 343 of the preceding ramp is a trapezoidal surface of which the small sides are oriented radially and correspond to the general substantially trapezoidal shape of the teeth 331 of which the sides 331s and 331D are oriented substantially in the radial direction. The bearing surface of the tooth 331 on the escutcheon 33 is smaller than the interval B between the origin 340 and the side 343D of the stop delimiting this interval B.

This concordance between the bearing surface of the teeth 331 and the interval B between the ramps 341 ensures a stable unclamping positioning of the escutcheon 33.

The teeth 331 of the escutcheon 33 cooperate with the ramps 341. The bearing block 34 is rotationally fixed because held, as will be described, by the arm 131a of the yoke, while being translationally free along the axle 31 in the direction YY; the anticlockwise movement (direction of clamping SER) of the escutcheon 33 makes the teeth 331 rise on the ramps 341 while thus pushing back the bearing block 34 while moving it away from the escutcheon 33. Since the length of the axle 31 between the escutcheon 33 and the nut 313 at the end of the axle 31 is fixed, the block 34 pushes against the first arm 131a and the nut 313 against the second arm 131b while thus blocking the two adjustments of the column, which corresponds to the position of the manoeuvring lever 32 of FIG. 1.

The ramps 341 continuing by a plateau 342 upstream of the stops 343, the pivoting movement no longer increases the clamping when the teeth 331 arrive on the plateaus 342.

Conversely, the clockwise pivoting movement (direction of unclamping DES) of the lever 32 and the escutcheon 33 makes the teeth 331 go down along the ramps 341 and decompresses the clamping device 3, freeing the adjustments. This release movement is sudden because it corresponds to the recoil from the compressed state of the different components of the clamping device 3. But this unclamping movement only begins when the teeth 331 arrive on their ramp 341.

In this mounting, the stop 343 at the end of each ramp 341 coming at least partially in the associated circular crown segment 335, at the end of unclamping movement (descent of the ramp 341 by the tooth 331), the side 331D of each tooth 331 comes against a stop 343; it involves a relative movement because the escutcheon 33 pivots around the axis YY whereas the block 34 and its ramps 341 are rotationally fixed around the axis YY.

In a more detailed manner, according to FIGS. 5A, 5B, the guiding block 34 is a solid part, assimilable to a parallelepiped rectangle of which the lateral sides 34c and the top/bottom 34d have a shape combining that of a disk centred on the axis YY to receive and surround the ramps 341 and that of a rectangle for the other functions of the bearing block 34 of which the corners are rounded.

One of the sides 34c slides along the folded edge 132 (FIG. 1) of the first arm 131a beyond the emplacement of the guiding plate 36.

As already described, the face 34a comprises three ramps 341a-c distributed around the piercing forming the bearing 344 according to a substantially rotationally symmetrical arrangement. The ramps 341a-c each end by a stop 343a-c.

The bearing block 34 cooperates by its back 34b with the arm 131a of which the window ensures the "vertical" guiding. The guiding plate 36 (FIG. 2) is also provided with a window 361. The back 34b of the bearing block 34 is provided with two guiding bars 345 in relief around the piercing of the bearing 344 to form guides in the window 361 and to receive the rider 35.

At the level of each side 34c, the bearing block 34 forms two bearing strips 346 bordered internally by a row of teeth 347. The teeth of each row 347 cooperate on clamping with the teeth of the toothed edges 362 of the guiding plate 36 to block the tilting adjustment.

The teeth improve the tilting resistance especially for a crash. The closing of the clamping system causes a sufficient friction for the maintaining of the system in a normal condition.

FIGS. 6A, 6B show a frontal view in the axis YY of the engagement of the three stops 343a-c of the ramps 341a-c of the bearing block 34 in the circular segments 335 of the escutcheon 33 in clamping position (FIG. 6A) and in unclamping position (FIG. 6B); these two positions correspond to end of travel positions.

To make FIGS. 6A, 6B more explicit, the stops 343 (341a-c) are shown by dark tops which, for design reasons, are not necessarily identical.

As indicated above, each stop 343a-c is associated with a circular segment 335 of the escutcheon 33 and projects into its segment 335 to serve as end of travel stop at the sides 331S and 331D of the teeth 331, pivoted respectively in end of clamping travel position (direction SER) defined by the sides 343S of the stops 343 (respectively 343aS, 343bS, 343cS) and in end of unclamping travel position defined by the sides 343D of the stops 343, respectively 343bD, 343cD, 343aD for these same teeth.

In other words, the interval between two rotationally fixed stops 343a-c, receives a tooth 331 and the two stops 343a-c which each delimit an interval constitute for each tooth 331 an end of travel stop for clamping and unclamping the escutcheon 33.

Thus, the tooth 331a is moveable between the end of clamping travel stop 343a and the end of unclamping travel stop 343c for its interval A comprised between the sides facing 343aS, 343cD the stops 343a and 343c, the same is true for the other teeth 331b and 331c since the escutcheon 33 pivots in the direction SER or DES with respect to the block 34 rotationally fixed around the geometric axis YY.

According to FIG. 6A and with reference to FIG. 4, the manoeuvring lever 32 and its escutcheon 33 have been pivoted into clamping position (arrows SER) in the anticlockwise direction.

The stop 343a of the ramp 341a (hidden by the tooth 331a) retains the side 331aS of the tooth 331a; the other teeth 331b, 331c are pivoted with the sides 331bS, 331cS against the stops 343b and 343c also fixed by hypothesis.

FIG. 6B shows the end of unclamping travel wherein, by the pivoting of the lever 32 and the escutcheon 33 in the direction DES, the side 331aD of the tooth 331a with its damping pin 334 is pressed against the side 343cD of the stop 343c; the same is true and with a certain delay corresponding to the phase of crushing the pin 334, the sides 331bD and 331cD of the teeth 331b and 331c which come against the side 343cD, 343aD of the stops 343c and 343a.

As an example, the position of the tooth 331a appears in FIG. 6C which is the sequencing of the ramps 341a-c of the block 34 highlighting the circular interval A between the two stops 343c and 343a receiving the tooth 331a:

the stop 343a limits the rotational movement of the escutcheon 33 and the tooth 331a in clamping position SER by its side 343aS beyond the plateau 342a,
the stop 343c limits the rotational movement of the escutcheon 33 and the tooth 331a in the direction of unclamping DES by its side 343cD.

At the end of clamping travel SER, the side 331aS of the tooth 331a encounters the side 341aS of the stop 343a.

At the end of unclamping travel DES, the side 331aD of the tooth 331a encounters the side 343cD of the stop 343c by the damping pin 334.

The different movements take place almost simultaneously with the other teeth 331b and 331c of the escutcheon 33.

The sudden movement triggered by the manoeuvring lever 32 and the escutcheon 33 by the release of the blocking of the adjustments of the column 100 is dampened by the abutment of the damping pin 334 against the end of travel stop 343c. The two other teeth 331b and 331c are then pressed softly against their respective unclamping stop 343c and 343d, which avoids any metal against metal impact noise.

This unclamping abutment represented in FIG. 6B is shown schematically in FIG. 6C which shows the movement of the tooth 331a with respect to its two end of travel stops 343a (clamping) and 343c (unclamping) and to their sides 343aS and 343cD.

According to FIGS. 7A, 7B, linked with FIG. 5A, the ramps 341 of the bearing block 34 are ramps of helicoidal shape with which the back of the teeth 331 of the escutcheon 33 cooperate.

The ramps 341 are oriented in the "rising" direction of the teeth 331 of the escutcheon 33 for a pivoting of the lever 32 in the anticlockwise direction and to go from the unclamped position (FIG. 7A) to the clamped position (FIG. 7B).

The pivoting of the lever 32 going from the position of FIG. 7A to that of FIG. 7B moves away the bearing block 34 with respect to the escutcheon 33 and produces the compression of the clamping device 3 since the length of the axle 31 between the escutcheon 33 and the threaded end provided with the nut 313 is a fixed length, blocked.

FIGS. 8A, 8AB, 8B are frontal views of the two extreme positions (FIGS. 8A, 8B) and an intermediate position (FIG. 8AB).

For the end of unclamping travel (FIG. 8A), the elasticity of the components of the clamping device 3 and the assembly 13/131a; 131b, 21 and their compression and stressing is freed and tends to thrust the escutcheon 33 and its lever 32 towards the end of unclamping travel position. On approaching this position of pivoting the lever 32, the dampening pin 334 encounters the stop of the bearing block 34 and dampens the impact while avoiding the metal/metal impact noise perceived negatively by the driver adjusting his steering wheel.

The damping pin 334 fits very simply in place in the cutout 333 of one of the sides of the tooth 331a.

FIG. 9 shows in its parts 9B-9D, three alternatives of damping elements 334', 334", 334''' placed in parallel with the damping element 334 represented in FIG. 2.

FIG. 9B shows the damping element 334' having a cylindrical body 334'a, of circular section, to engage in the cut-out 333 of the escutcheon 33 and a widened end 334'b.

The second alternative of damping element represented in FIG. 9C is constituted by a simple cylindrical body 334"a, of circular section.

Finally, the third alternative 334''' of the damping element represented in FIG. 9D is composed of a cylindrical body 334'''a, of oval section, forming a damping part in relief 334'''c, the whole surmounted by a widened end 334'''b.

FIGS. 10 and 11 show an alternative of clamping device 3' of which elements identical to those of the first embodiment described above bear the same references; analogous elements or elements of analogous function bear the same numerical references completed by a «'».

The clamping device 3' is composed of a clamping axle 31 of which the installation in the steering column is identical to that which has been described for the first embodiment. This clamping device 3' differs from the preceding embodiment by the deployable connection between the escutcheon 33' through which the lever 32 is connected to the clamping axle 31 and the bearing block 34'. This deployable connection is no longer constituted by ramps but by two connecting links 341' known per se, of which the ends in the form of ball joint are housed in ball joint cups formed in the escutcheon 33' and in the bearing block 34'.

The pressed section of the cups of the escutcheon 33' appears in the form of domes 341'a.

The pivoting movement of the escutcheon 33' tilts the connecting links 341' to move away or bring closer the bearing block 34' to the escutcheon 33' and thus to clamp or unclamp the clamping device 3' and block or unblock the adjustments of the steering column. A spring 316, fitted on the clamping axle 31, pushes the bearing block 34' towards the escutcheon 33' and thus maintains the connecting links 341 under compression.

The escutcheon 33' has a cut out circular segment 335' of which the two ends constitute ends of travel 335'a, 335'b. The end of clamping travel 335'a is the end of the circular segment 335' in the direction of clamping whereas the other end of travel 335'b is constituted by a damping element 334 fixed in a cut-out 333' at the end of unclamping of the circular segment 335'. The bearing block 34' is provided with a stop 343' of cylindrical shape with circular section projecting into the circular segment 335'. This stop 343', non-elastic, comes into clamping position on contact with the end of clamping travel 335'a which thus defines a precise clamping position.

For unclamping, the stop 343' dampens the impact between the stop 343' and the damping element 334. As in the first embodiment, the circular segment 335' is moveable and the stop 343' is fixed. For the fixation of the damping element, the circular segment 335' ends by a cut-out 333' receiving the damping element 34.

The damping element 334 may be any of the alternatives of FIGS. 9A-9D.

NOMENCLATURE OF THE MAIN ELEMENTS

100 Steering column
1 Support
11 Cross-member
12 Side
13 Yoke
131a First arm
131b Second arm
132 Folded edge
15 Pivot
2 Sleeve
21 Cradle
22 Deformable bearing
23 Spring
24 Lug
3, 3' Clamping device
31 Clamping axle
311 Head
312 Threaded end
313 Nut
314 Needle roller stop
315 Washer
316 Spring
32 Manoeuvring lever
33, 33' Escutcheon
331 Radial tooth (331a,b,c)
3311 End
331S Clamping side of the tooth 331 (331aS, 331bS, 331cS)
331D Unclamping side of the tooth 331 (331aD, 331bD, 331cD)
332 Peripheral crown
333 Cut-out
334 Damping element
334a Body
334b Widened end
334', 334", 334''' Alternative of damping element
335, 335' Circular segment
335'a,b End of travel
336 Circular path
34, 34' Bearing block
34a Face
34b Back
34c Side
34d Above/below
340 Origin of the ramp/340a,340b,340c
341 Ramp (341a-341c)
341' Connecting link
341'a Dome
342a-c Plateau
343,343' Stop (343a-343c)
343S Clamping side (342aS,343bS,343cS)
343D Unclamping side (343aD,343bD,343cD)
344 Bearing
345 Guiding bar
346 Bearing strip
347 Row of teeth
35 Rider
36 Guiding plate
361 Window
362 Toothed edge

The invention claimed is:

1. Steering column comprising:
   a cradle mounted tilting on a body of a vehicle and receiving, in a deformable bearing, a sleeve provided with a tube bearing a steering wheel and translationally integral with the sleeve but rotationally free with respect thereto,
   the sleeve being adjusted by sliding in the unclamped deformable bearing,
   a device for clamping the deformable bearing comprising:
      a manoeuvring lever bearing, by an escutcheon, a clamping axle of which a lever end is pressed directly against the deformable bearing and the manoeuvring lever pressing against the deformable bearing through a bearing block rotationally fixed but translationally free on the clamping axle,
      the manoeuvring lever being, by the escutcheon, pressed against the bearing block by a deployable connection which,
      for the movement of the manoeuvring lever in the direction of clamping, clamps the bearing between the lever end and the bearing block to block the deformable bearing on the sleeve, and
      for the movement of the lever in the direction of unclamping, frees the bearing and the sleeve for the adjustment,
   steering column characterised in that
      the escutcheon has at least one circular segment of which one end constitutes an end of clamping travel and the other end constitutes an end of unclamping travel having a damping element, wherein the damping element includes a pin fixed in a cut-out of the escutcheon,
      the bearing block, traversed by the clamping axle, having a stop projecting into the at least one circular segment to come against the end of clamping travel in clamped position and against the damping element in unclamping position.

2. Steering column according to claim 1, wherein the deployable connection between the escutcheon and the bearing block is formed:
- by the escutcheon with teeth fixing the clamping axle and leaving between them the at least one circular segment, and by
- the bearing block, traversed by the clamping axle, having, distributed around the bearing of the axle, a ramp for each tooth, these ramps ending in a stop projecting into the at least one circular segment between two of the teeth so that each tooth goes up its ramp during the clamping movement and goes down the ramp during the unclamping movement, the stop of at least one ramp coming against the damping element of its at least one circular segment.

3. Steering column according to claim 2, wherein the ramp continues by a plateau upstream of its stop in the direction of clamping.

4. Steering column according to claim 2, wherein
one at least of the teeth has a damping element on its unclamping side,
the damping element is fixed by snap fitting in a cut-out of the edge of the unclamping side of the tooth.

5. Steering column according to claim 4, wherein the damping element in the form of a pin made of a flexible material is composed of a body forming an intermediate part, cylindrical of circular section and with two widened ends opening out on the two faces of the escutcheon, the body being snap fitted in a circular cut-out of dimensions greater than those of a circular half-disk, at the end of unclamping of the at least one circular segment.

6. Steering column according to claim 2, wherein the ramp is in the form of a helicoidal surface of which the axis is the geometric axis of the clamping axle.

7. Steering column according to claim 6, wherein the teeth and the stops have sides of radial orientation with respect to the geometric axis of the clamping axle.

8. Steering column according to claim 7, wherein a bearing surface of at least one tooth of the teeth on the escutcheon is smaller than the interval between an origin of the ramp and the side of the stop delimiting this interval with the origin, wherein the bearing surface is configured to engage the ramp.

9. Steering column according to claim 2, wherein the damping element is chosen from the group comprising:
- a damping element formed of a cylindrical body with circular section bordered by two widened ends,
- a damping element forming a cylindrical body with circular section, bordered by a widened end,
- a damping element formed of a cylindrical body with circular section,
- a damping element formed of a cylindrical body with oval section forming a protrusion and a widened end.

10. Steering column according to claim 1, wherein
the escutcheon includes the at least one circular segment and is connected to the bearing block by ball joint connecting links, received in ball joint cups of the escutcheon and the bearing block,
the bearing block having at least one stop coming in the at least one circular segment of which the end of unclamping travel is provided with the damping element.

11. Steering column according to claim 10, wherein the damping element is chosen from the group comprising:
- a damping element formed of a cylindrical body with circular section bordered by two widened ends,
- a damping element forming a cylindrical body with circular section, bordered by a widened end,
- a damping element formed of a cylindrical body with circular section,
- a damping element formed of a cylindrical body with oval section forming a protrusion and a widened end.

* * * * *